United States Patent [19]

Kato

[11] Patent Number: 5,475,787
[45] Date of Patent: Dec. 12, 1995

[54] ELECTRONIC DISPLAY UNIT

[75] Inventor: Katsutoshi Kato, Yokkaichi, Japan

[73] Assignee: Sumitomo Wiring Systems, Ltd., Japan

[21] Appl. No.: 248,653

[22] Filed: May 25, 1994

[30] Foreign Application Priority Data

Jun. 29, 1993 [JP] Japan .................................. 5-187009

[51] Int. Cl.⁶ ........................................................ H02P 5/17
[52] U.S. Cl. ...................... 388/811; 318/568.25; 318/14; 318/15; 318/280; 318/282
[58] Field of Search ................................ 318/568.25, 14, 318/15, 280, 282; 388/811

[56] References Cited

U.S. PATENT DOCUMENTS

| | | | |
|---|---|---|---|
| 4,031,437 | 6/1977 | Dempsey et al. | 318/280 |
| 4,881,018 | 11/1989 | Kato et al. | 318/280 |
| 4,983,890 | 1/1991 | Satoh et al. | 318/282 |
| 4,998,049 | 3/1991 | Chapman | 318/280 |
| 5,027,049 | 6/1991 | Pratt et al. | 318/280 |
| 5,194,789 | 5/1993 | Barrs | 318/568.25 |

FOREIGN PATENT DOCUMENTS

| | | | |
|---|---|---|---|
| 0338405 | 10/1989 | European Pat. Off. | |
| 2254847 | 11/1975 | France . | |
| 2379686 | 1/1978 | France . | |
| 38981 | 12/1993 | Japan | B60R 11/02 |
| 9204202 | 3/1992 | WIPO . | |

*Primary Examiner*—William M. Shoop, Jr.
*Assistant Examiner*—Karen Masih
*Attorney, Agent, or Firm*—Jordan B. Bierman; Bierman and Muserlian

[57] ABSTRACT

There is disclosed an electronic display unit wherein a motor driving portion including a CPU and a driving IC controls a drive current to a motor (11) so that the motor (11) initially rotates at a low speed and subsequently rotates at a high speed to switch the speed of rotation of a case (3) from a low speed to a high speed, whereby operability is ensured if a rotation control switch is disposed on a front surface of the case (3), preventing conventionally increased size of the unit as well as alleviating user's feeling that rotation requires too much time.

8 Claims, 3 Drawing Sheets

5,475,787

ELECTRONIC DISPLAY UNIT

BACKGROUND OF THE INVENTION

1. Field of the Invention

The present invention relates to an electronic display unit such as a navigation system mounted in an automotive vehicle.

2. Description of the Prior Art

In the past, an automotive navigation system which is an electronic display unit has been adapted such that a motor is driven by operating a control switch provided on a front surface thereof and the rotation of the motor is transferred by gears to a unit body which in turn rotates through a predetermined angle.

The motor is controlled to rotate at a constant speed and, accordingly, the unit body rotates at a constant speed.

The reason for rotating the unit body as above described is that it is necessary to effectively utilize, in particular, the rear space of this type of unit body which is commonly embedded in a center console within the automotive vehicle. The unit body is required to be minimized in size in terms of layout of the unit body itself. However, a display screen of an LCD and the like is not permitted to be very small in size in order to ensure visibility.

The prior art navigation system rotates at a constant speed as above described. Rotation at a very high speed is disadvantageous in that, as soon as the control switch on the front surface of the unit body is operated, the unit body starts rotating to strike user's fingers. For this reason, so high speed of rotation is impractical, resulting in some users feeling that the rotation requires too much time.

One approach for ensuring the operability of the control switch independent of the speed of rotation of the unit body is to provide an additional non-rotatable control panel on which the switch is disposed. The provision of such a control panel increases the entire size of the display unit. As above stated, it is necessary to avoid the increased size of the unit body since it is disposed in the center console. In addition, the entire size reduction is required while the size of the display screen of the LCD is sufficiently ensured. For these reasons, the control switch is required to be disposed on the front surface of the unit body.

SUMMARY OF THE INVENTION

The present invention is intended for an electronic display unit including a support box element fixed to a fixing member, and a unit body having a display and rotatably supported by the support box element. According to the present invention, the electronic display unit comprises: a motor housed in the support box element; a control switch provided on a front surface of the unit body, the control switch being operated to selectively rotate the motor either in a regular direction or in the reverse direction; rotation transfer means for transferring the rotation of the motor to the unit body to rotate the unit body through a predetermined angle until the regular rotation of the motor causes the unit body to be substantially horizontal and the reverse rotation of the motor causes the unit body to be substantially vertical; and a motor driving portion housed in the support box element for supplying a drive current to the motor either in a direction of the regular rotation or in a direction of the reverse rotation by operation of the control switch, the motor driving portion controlling the drive current such that the motor rotates at a low speed during the time interval between start of rotation and rotation at a predetermined angle and subsequently rotates at a high speed.

As above described, according to the electronic display unit of the present invention, the motor driving portion controls the drive current to the motor so that the motor initially rotates at low speeds and subsequently rotates at high speeds. This ensures the operability of the control switch on the front surface of the unit body, and alleviates user's feeling that rotation takes too much time, thereby providing the electronic display unit such as a navigation system which is small in size and convenient for use.

It is an object of the present invention to ensure improved operability of a control switch of an electronic display unit and to alleviate user's feeling that rotation of a unit body of the electronic display unit requires too much time.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
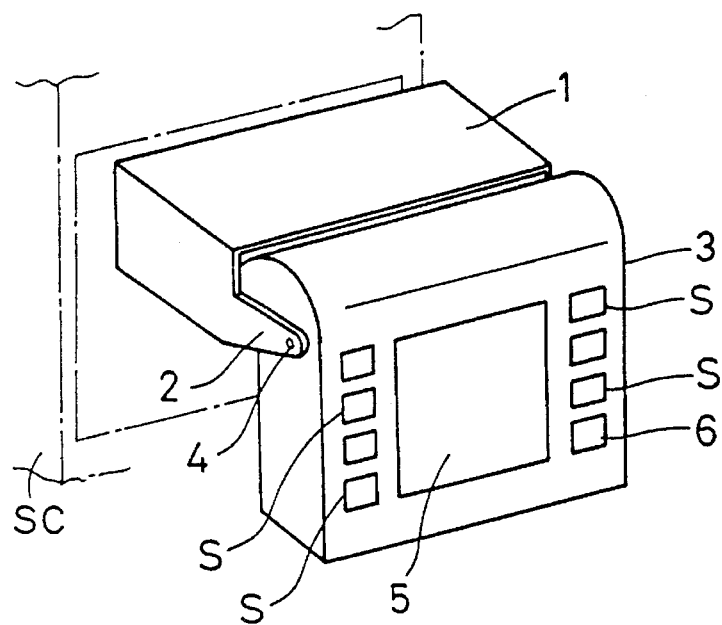
FIG. 4 is a general outside view in perspective of the present invention.

In general schematic construction, a support box element 1 is fixed on a fixing member such as a center console SC within an automotive vehicle, as shown in FIG. 4. Support pieces 2 extending from opposite sides of the front end of the support box element 1 are formed integrally with the support box element 1. Both of the support pieces 2 rotatably support support shafts 4 provided in upper end portions of opposite side surfaces of a case 3 serving as a unit body. The case 3 is rotatably mounted to a predetermined recessed storage portion of the center console SC through the support box element 1.

Figure 5:
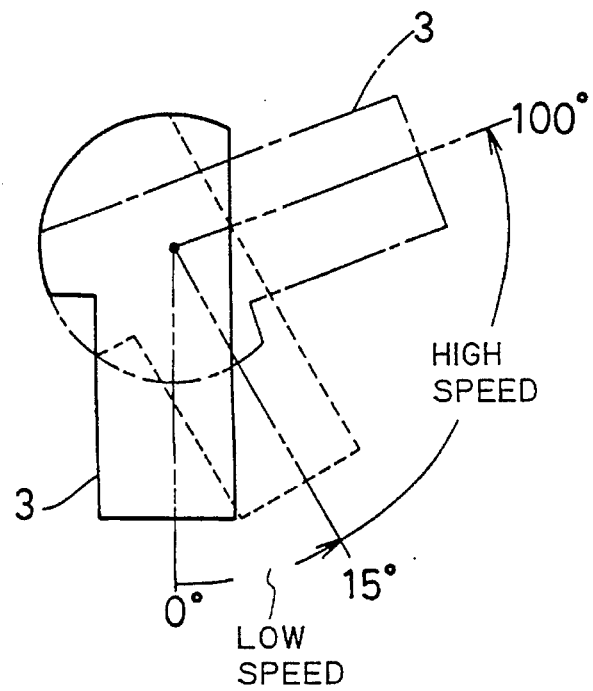
FIG. 5 illustrates operation of the present invention.

The case 3, when not in use, is held substantially vertically as shown in solid lines in FIG. 5. The case 3, when in use, is rotated through the angle of 100° from the not-in-use state and is held with a front part thereof raised from the horizontal, as shown in dashed-and-dotted lines in FIG. 5.

Referring to FIG. 4, an opening is provided at the center of the front surface of the case 3, and a display screen 5 of an LCD is provided in the opening. A plurality of control switches S are arranged on opposite sides of the display screen 5. One of the control switches S is a rotation control switch 6 for rotating the case 3.

Figure 1:
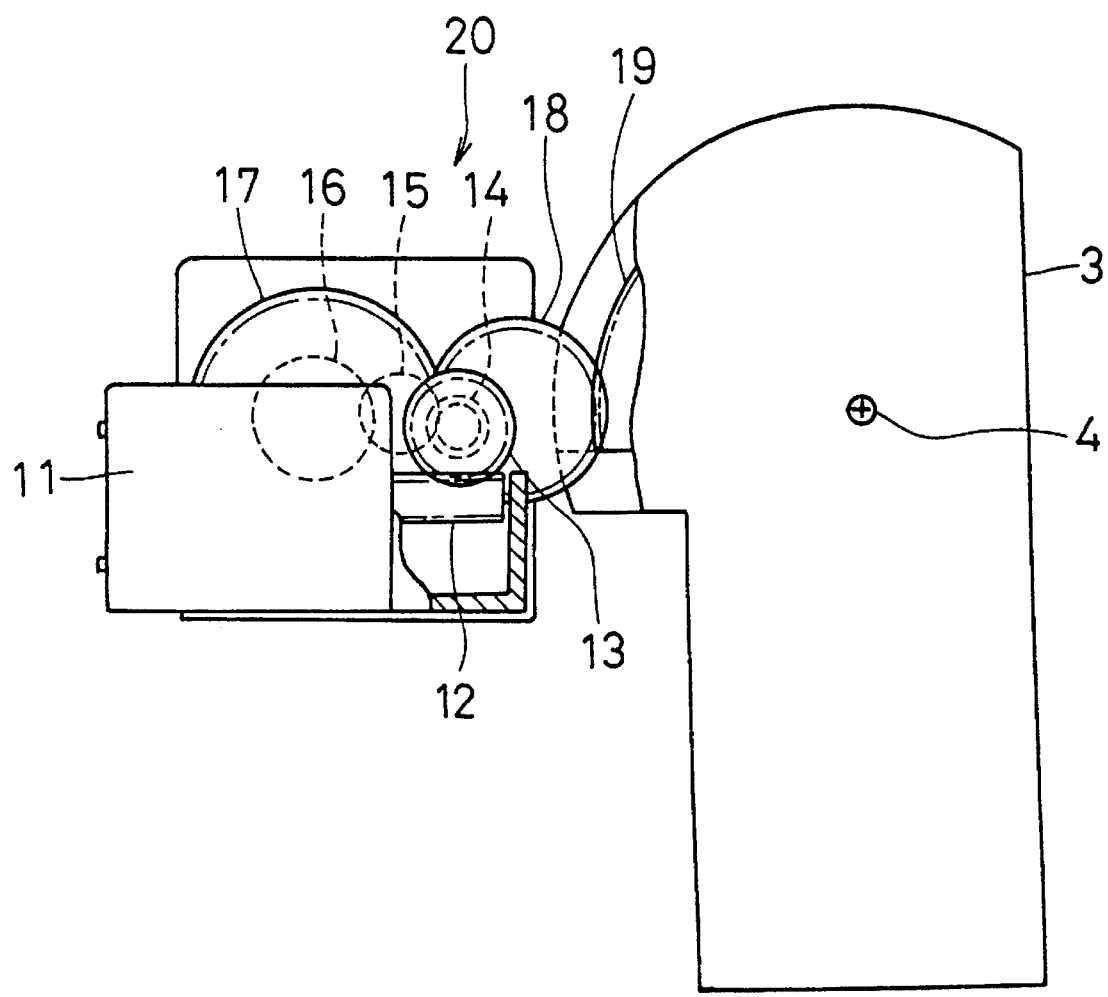
FIG. 1 is a left side view of an electronic display unit embodying the present invention.

A mechanism for rotating the case 3 is constructed as shown in FIG. 1. A motor 11 is provided in the support box element 1, and a worm 12 is attached to the rotating shaft of the motor 11. A first small-diameter gear 14 coaxial with a worm wheel 13 in meshing engagement with the worm 12 mates with a second gear 15 having a diameter a little greater than that of the first gear 14. The second gear 15 mates with a third gear 16 having a diameter a little greater than that of the second gear 15. A fourth large-diameter gear 17 coaxial with the third gear 16 mates with a fifth gear 18 having a diameter a little smaller than that of the fourth gear 17. The fifth gear 18 mates with a sixth arcuate gear 19 at the upper end on the rear side of the case 3. The worm 12, the worm wheel 13, and the first to sixth gears 14 to 19 form a rotation transfer means 20. The rotation of the motor 11 is suitably decelerated through the rotation transfer means 20 and transferred to the case 3.

Figure 2:
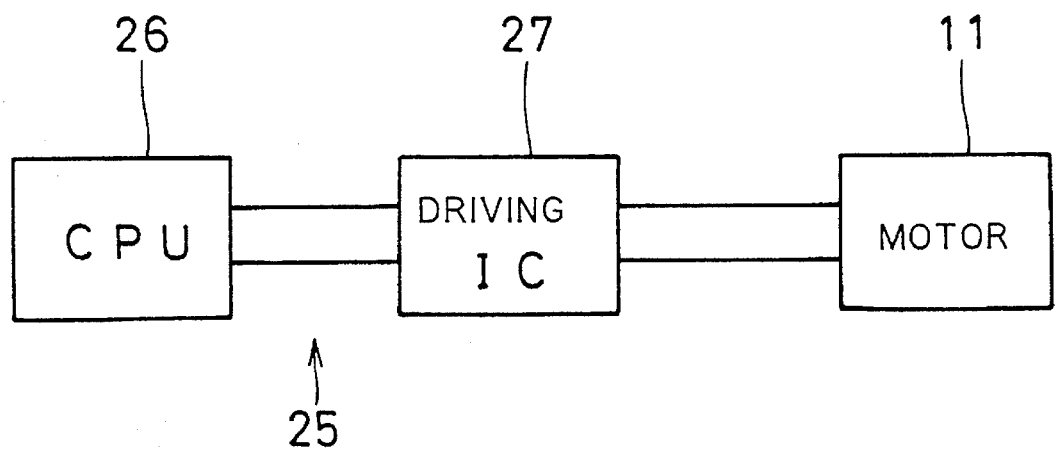
FIG. 2 is a circuit block diagram of a motor driving portion in FIG. 1.
Figure 3:
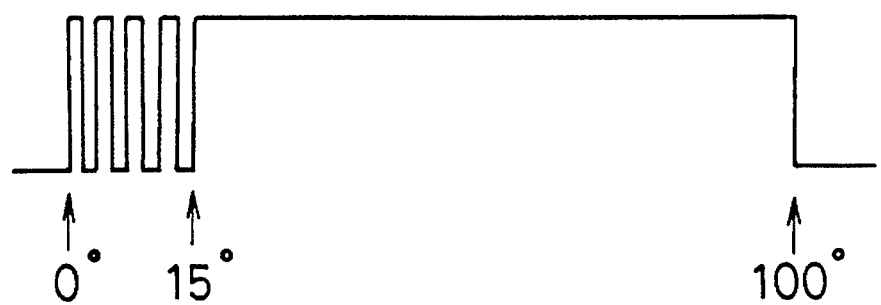
FIG. 3 illustrates operation of FIG. 2.

A motor driving portion 25 for controlling the motor 11 includes a CPU 26, and a driving IC 27 controlled by the CPU 26 for supplying a drive current to the motor 11, as shown in FIG. 2. A control signal is outputted from the CPU 26 to the driving IC 27 by operation of the rotation control switch 6. In response to the control signal, for example, a pulse-shaped drive current is fed from the driving IC 27 to the motor 11 during the time interval between rotation of the case 3 at the angle of 0° in the vertical position and at the angle of 15°, and a constant drive current is fed from the driving IC 27 to the motor 11 during the time interval between rotation of the case 3 at the angle of 15° and at the angle of 100°, as shown in FIG. 3.

Thus, the motor 11 initially rotates at low speeds, for example 2 rpm, and subsequently rotates at high speeds, for example 7 rpm, thereby to rotate the case 3 from the not-in-use state into the in-use state. The same is true for the operation of the rotation control switch 6 when the case 3 is in use. The motor 11 initially rotates at low speeds and then rotates at high speeds, thereby to rotate the case 3 from the in-use state into the not-in-use state.

Since the case 3 initially rotates at low speeds, the operability of the rotation control switch 6 is insured if the rotation control switch 6 is disposed on the front surface of the case 3. The display unit is prevented from being increased in size due to the prior art provision of the rotation control switch 6 in other position, thereby providing a small-sized navigation system.

Further, since the rotation speed of the case 3 is changed from low speeds to high speeds, user's feeling is alleviated that rotation of the case 3 requires too much time.

Although the present invention is applied to the automotive navigation system in the preferred embodiment, the present invention may be similarly implementing upon any electronic display unit which is rotated by a motor serving as a driving source.

While the invention has been shown and described in detail, the foregoing description is in all aspects illustrative and not restrictive. It is therefore understood that numerous modifications and variations can be devised without departing from the scope of the invention.

What is claimed is:

1. An electronic display unit including a support box element fixed to a fixing member, and a unit body having a display and rotatably supported by said support box element, said electronic display unit comprising:

a motor housed in said support box element;

a control switch is provided which operates to selectively rotate said motor either in a regular direction or in the reverse direction;

a device for transferring the rotation of said motor to said unit body to rotate said unit body through a predetermined angle until regular rotation of said motor in said regular direction causes the unit body to move to a receiving position and reverse rotation of said motor in said reverse direction causes the unit body to move to a non-use position; and a motor driving portion housed in said support box element for supplying a drive current to cause said motor to move either in said regular direction or in said reverse direction by operation of said control switch, said motor driving portion adapted to control said drive current so that said motor rotates at a low speed during a time interval between start of rotation and a predetermined angle and subsequently rotates at a high speed.

2. The electronic display unit of claim 1, wherein said device includes: a worm attached to a rotating shaft of said motor; a worm wheel in meshing engagement with said worm; a first gear coaxial with said worm wheel; a second gear mating with said first gear; a third gear mating with said second gear; a fourth gear coaxial with said third gear; a fifth gear mating with said fourth gear; and a sixth arcuate gear formed in said unit body and mating with said fifth gear.

3. The electronic display unit of claim 1, wherein said motor is a DC motor, and said motor driving portion feeds a pulse-shaped drive current to said motor during the time interval between start of rotation and rotation at said predetermined angle and subsequently feeds a constant drive current to said motor.

4. The electronic display unit of claim 1, wherein said display includes a liquid crystal display.

5. The electronic display unit of claim 1, wherein said fixing member is a structure member of a center console provided within an automotive vehicle.

6. The display unit of claim 1 wherein said device rotates said unit body between a starting position and a position forming an angle of 100° thereto.

7. A method of moving a generally planar unit between a first position, wherein a plane of said unit is substantially vertical, and a second position, wherein said plane is substantially horizontal, said method comprising starting from either said first position or said second position, rotating said unit for a first period of time at a first speed, and continuing said rotation for a second period of time at a second speed, said second speed being greater than said first speed.

8. A method of moving a generally planar unit between a first position, wherein a plane of said unit is substantially vertical, and a second position, wherein said plane is substantially horizontal, said method comprising starting from either said first position or said second position, rotating said unit and through a first angle at a first speed, and continuing said rotation through a second angle at a second speed, said second speed being greater than said first speed.

\* \* \* \* \*